United States Patent
Budni et al.

(10) Patent No.: US 7,170,909 B2
(45) Date of Patent: Jan. 30, 2007

(54) LOW QUANTUM DEFECT HOLMIUM FIBER LASER

(75) Inventors: Peter A. Budni, Nashua, NH (US); Peter A. Ketteridge, Amherst, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 246 days.

(21) Appl. No.: 10/853,352

(22) Filed: May 25, 2004

(65) Prior Publication Data

US 2007/0002905 A1    Jan. 4, 2007

(51) Int. Cl.
*H01S 3/30* (2006.01)
(52) U.S. Cl. .......................................... 372/6
(58) Field of Classification Search ............... 372/6, 372/3; 359/341.3; 385/123
See application file for complete search history.

(56) References Cited

U.S. PATENT DOCUMENTS

| | | | |
|---|---|---|---|
| 5,036,520 A | 7/1991 | Bowman et al. | |
| 5,287,378 A | 2/1994 | Bowman et al. | |
| 5,299,210 A * | 3/1994 | Snitzer et al. | 372/6 |
| 6,373,863 B1 | 4/2002 | Ohishi et al. | |
| 6,583,927 B2 * | 6/2003 | Choi et al. | 359/341.5 |
| 6,631,234 B1 | 10/2003 | Russell et al. | |
| 2004/0057105 A1 * | 3/2004 | Choi et al. | 359/341.3 |
| 2004/0156606 A1 * | 8/2004 | Po | 385/123 |

OTHER PUBLICATIONS

PCT International Search Report dated May 30, 2006 of International Application No. PCT/US05/18048 filed May 23, 2005.

* cited by examiner

*Primary Examiner*—Minsun Oh Harvey
*Assistant Examiner*—Tuan N. Nguyen
(74) *Attorney, Agent, or Firm*—Joseph E. Funk

(57) ABSTRACT

A directly pumped, un-sensitized, holmium, quasi-two level fiber laser is disclosed that is doped with Holmium active ions between 0.1 and 2.0 percent by atomic weight. This yields greater energy efficiency from the laser because up-conversion losses are minimized, mismatches created by sensitizer ions are eliminated by having no sensitizer ions, and thermal loading of the fiber medium of the laser is thereby reduced. In addition, the pump ratio of the fiber laser is 0.9 which yields a very low quantum defect. The low doping percentage of holmium active ions also eliminates any absorption of its own energy because the power of the diode pumping source is sufficient to cause the laser to reach transparency.

14 Claims, 3 Drawing Sheets

21

Photonic Crystal Fiber

22

Photonic Bandgap Crystal Fiber

LOW QUANTUM DEFECT HOLMIUM FIBER LASER

FIELD OF THE INVENTION

This invention relates generally to the field of solid state lasers, and, more specifically to a laser system comprising a directly pumped rare earth, such as a Holmium, doped fiber laser.

BACKGROUND OF THE INVENTION

In many lasers, a light-emitting element is added as a dopant to a compound that serves as a crystalline or amorphous host. The characteristics of a solid-state laser depend on the dopant and crystalline compounds that are selected. Light emitting dopant materials include all the trivalent rare earth ions.

All laser materials have characteristic energy levels and transitions so that photons are emitted at certain transitions when electrons drop from excited states to lower states. Likewise, the materials absorb light at characteristic wavelengths when they are in the ground state or other low levels.

Light absorption can be at a narrow or broad range of wavelengths depending on the transitions involved. Laser operation at the holmium $^5I_6$ to $^5I_7$, and $^5I_7$ to $^5I_8$ transitions have been reported at near 2.9 μm and 2.1 μm in several different host crystals. Holmium has few absorption bands for pumping in the visible and near-IR (infrared). Consequently, laser performances using broad spectral emission pump sources have been poor except where additional sensitizer (codopant) ions have been used.

Thulium (Tm) sensitized holmium laser materials have proven to be quite useful but have several disadvantages. For example, the near energy resonance between the Tm $^3F_4$ and Ho $^5I_7$ results in incomplete energy transfer from the sensitizer ions. At room temperature with otherwise optimal densities of sensitizer, transfer of only approximately 60% of the stored excitation density to holmium ions can occur. This incomplete transfer proportionally increases the already high lasing thresholds associated with holmium. Further, the interaction of Tm $^3F_4$ and Ho $^5I_7$ metastable ions create a detrimental up conversion loss process that severely limits energy storage lifetimes and small signal gains. In addition, the short pulse performance of Tm/Ho lasers are limited by the up conversion loss process and the relatively slow (about 20 μsec) energy transfer from Tm $^3F_4$ and Ho $^5I_7$. Finally, the thermal loading of the Tm/Ho laser material is increased by the incomplete energy transfer and up conversion losses, thereby limiting the utility of such material for average power production. Other sensitizer co-dopants also create problems.

Lasers exist in the form of laser diodes, crystal lasers and gas lasers, and optical fiber lasers, which are all known in the art. Optical fibers used for optical fiber lasers may be an all glass fiber, a glass fiber with a doped core and a cladding, or combination thereof. In addition a photonic bandgap structure may be used. The core of the optical fiber is doped with a dopant, such as listed above, the ions of which are pumped using light energy from one of many types of sources that include flashlamps of the correct wavelength and line width, laser diode arrays, crystal lasers and other optical fiber lasers. In some situations, the pump energy may be absorbed by non-lasing energy levels of the ions. However, upon receipt of the energy at the non-lasing energy levels electrons at those energy levels are boosted to higher energy levels or "states". However, the electrons can only stay at higher energy levels for a limited amount of time before giving up their extra energy and fall to lower energy levels in what is termed a "transition" and emit photons of light at known wavelengths.

The newest member of the optical fiber family used to make optical fiber lasers is a photonic crystal fiber. Photonic crystal fibers utilize diffraction as a means to guide light in a glass fiber. The material in which the light is guided, i.e., the core of the optical waveguide, can have a relatively low refractive index and thus a lower density.

A photonic crystal fiber is made up of a regular geometric array of generally parallel, axial passages formed along the length of a solid optical fiber. To create the photonic crystal fiber a plurality of rods or fibers are disposed parallel to and about a solid, central rod or fiber to form a bundle. Each of the plurality of silica fibers surrounding the central fiber has an axial passage formed through it along its entire length. A rare earth dopant is added to the central fiber to provide optical gain to the laser, and the dopant preferably has a radial profile selected to enhance the stability of lower order modes through the photonic crystal fiber. All the fibers are preferably formed of a transparent, low-loss, damage resistant material such as silica. The index of refraction of the plurality of silica fibers surrounding the central fiber is different than the index of refraction of the doped central fiber. In the preferred embodiment of the invention the dopant is Holmium and it is directly pumped using 1.9 micron radiation.

The bundle of fibers are processed to transform them into a sintered cluster in the form of a geometric array (e.g. hexagonal) that is known as a photonic crystal fiber. A reflective coating is deposited on an outer surface of the array to confine pumped light therein. Light used to pump the laser is injected into the fiber bundle from the side by focusing it through small holes in the reflective coating, or by reflecting it off transverse Bragg gratings written into a fiber pigtail coupled to the end of the photonic crystal fiber. The mode field diameter of the photonic crystal fiber is controlled by properly selecting the diameter and spacing of the passages in the fibers surrounding the central rod.

A reflective coating is deposited on the outer surface of the photonic crystal fiber bundle to confine pump light therein. The reflective coating is preferably a metallic material such as silver or aluminum. Alternatively, the reflective coating may be formed by encasing the photonic crystal fiber bundle in a sleeve of material having a different index of refraction than the individual fibers making up the composite photonic crystal fiber.

When a photonic crystal fiber is used as a laser, the mode is repeatedly reflected off of a dielectric coating disposed on both ends of the fiber that is highly reflective at the laser wavelength and minimally reflective at the pump wavelength. After the mode gains sufficient power, it leaks through one of the reflective coatings at the end of the fiber in a steady stream. To accomplish this, it is preferred to form one of the reflective end coatings with less than 100% reflectivity at the output wavelength of the laser.

SUMMARY OF THE INVENTION

According to the teaching of the present invention, a directly pumped, unsensitized, rare earth, quasi-two level fiber laser is provided which affords a number of important advantages over a sensitized holmium system laser. These advantages include reducing the thermal loading of the laser medium, reducing the up-conversion losses, increasing the short pulse extraction efficiency, reducing the sensitivity of the gain provided to temperature effects, and increasing the flexibility in the selection of rare earth ion concentrations and rare earth host materials.

The fiber laser itself is made using a silica (or other composition ie. phosphate, ZBLAN, fluoride glasses) or other double clad fibers, or may be a photonic crystal fiber laser. The central core of the double clad fiber or the photonic crystal fiber of the fiber laser is doped with active ions of a rare earth, such as Holmium, to between 0.1 and 2.0 percent by atomic weight. For the wavelengths described herein Holmium is the preferred rare earth used to dope the fiber laser, so reference hereinafter is made.

With no sensitizer ions being added with the Holmium ions energy mismatches created by the sensitizer ions are eliminated. This results in greater energy efficiency of the fiber laser in accordance with the teaching of the present invention.

The pumping laser is preferably a laser diode array, well known in the art, providing an output having a wavelength of 1.9 μm. Other light sources such as Tm fiber lasers and crystalline solid-state lasers may be used provided they have the correct intensity, wavelength and line width. The output from the laser diode array is input to the fiber in manner well known in the art. The direct optical pumping of the Holmium ions by the laser diode array is from the Holmium $^5I_8$ level to its $^5I_7$ level. The coherent light output from the fiber laser has a wavelength of 2.0 μm which provides a pump ratio of 0.9. This yields a very low quantum defect.

The fiber laser is preferably constructed from a double clad fiber with a central core of a first refractive index that is doped with the Holmium active ions, an inner cladding of a second, lower refractive index surrounding the central core and an outer cladding of a third, even lower, refractive index surrounding the inner cladding. In the fiber the core is doped and functions as the laser and as a waveguide while the inner cladding functions as a waveguide for the coherent light from the laser diode array. The fiber laser may also be constructed using a photonic crystal fiber as long as the core is doped with Holmium active ions between 0.1 and 2.0 percent by atomic weight.

Holmium is quasi tri-level system ($^5I_8$, $^5I_7$ and $^5I_5$) and can absorb its own energy. This creates a problem when there is greater than 2% Holmium by atomic weight as the doping ion in the fiber core. In addition, the higher the percentage of Holmium ions as the doping ions the more intense the pumping must be to reach transparency, which is the point where the Holmium ions do not absorb their own photonic radiation. Stated another way, if transparency is not reached there are not enough Holmium ions excited to higher energy levels to emit enough photons to lase, so the Holmium absorbs its own lower level photonic radiation. This problem is eliminated by the present invention which uses less than 2% by atomic weight of Holmium and uses the directly pumped scheme for pumping the of Holmium ions in the fiber core.

Another advantage achieved with the present invention is that there is less detrimental heat generated because with the lower percentage of doping Holmium ions, less up conversion takes place which is a prime cause of heating in the Holmium laser system. The energy produced by up conversion converts to phonons which are acoustic energy which is in turn converted to heat in a laser.

DESCRIPTION OF THE DRAWING

The invention will be better understood upon reading the following Detailed Description in conjunction with the drawing in which.

DETAILED DESCRIPTION

Figure 1:
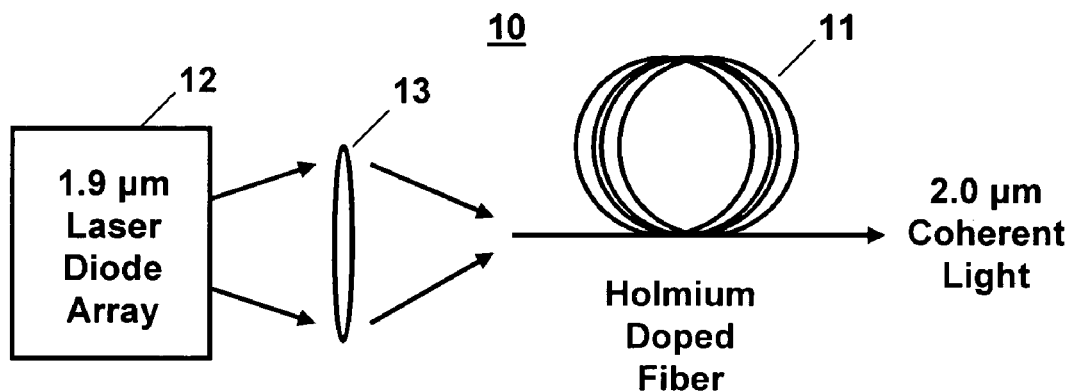
FIG. 1 is a block diagram of the Holmium doped fiber laser device of the present invention.

FIG. 1 is a block diagram of a directly pumped, unsensitized, quasi-two level Holmium (Ho) doped, fiber laser 10 that is pumped by a laser diode array at 1.9 μm and lases 2.0 μm in accordance with the teaching of the preferred embodiment of the invention. Other pump sources may be used such as other rare earth (Tm) doped fibers. In addition crystal lasers may be used as a pump source. The directly laser pumped laser 10 provides a number of important advantages over a sensitized Holmium fiber laser. These advantages include reducing heating in the holmium doped host material as compared to lamp pumping, and reducing up-conversion losses as described hereinafter.

Fiber 11 is preferably made from silica and is well known in the art, but may be made of fluoride, ZBLAN and phosphate glasses or any other material capable of supporting holmium doping and being configured as a fiber laser. The fiber 11 may be a well known double clad type 15, 16 such as shown in and described with reference to FIGS. 3A, 3B and 4, may be a photonic crystal fiber 21 such as shown in and described with reference to FIG. 5, or may be a photonic band gap crystal fiber 22 such as shown in and described with reference to FIG. 6. As the art develops there may well be other fibers that can be used to practice the invention.

The central core of fiber 11 in FIG. 1 is doped with Holmium active ions between 0.1 and 2.0 percent by atomic weight. This is a doping level below that typically done in the prior art. Having this low level of doping reduces the laser "transparency problem described in the following paragraph. With a doping level this low the length of the fiber 11 of fiber laser 10 must be longer than is normal in the prior art in order to absorb all 1.9 μm wavelength pump energy from laser diode array 12. The term doping means to use a small concentration of an added material that does not significantly affect the properties of the host glass of the fiber. The dopant is added to a batch of the glass from which the fiber core is made. In addition, other active dopants (herein referred to as sensitizers) can be added to the core as discussed further in this description.

Holmium is a quasi two-level system ($^5I_8$ and $^5I_7$) and can absorb its own energy, when "transparency" is not reached. This problem may be created when there is greater than 2% Holmium by atomic weight as the doping ion in the fiber core 17a, 17b in FIGS. 3A, 3B and 4. The higher the percentage of Holmium ions as the doping ions the more intense the pumping of laser 10 must be to reach "transparency", which is the point where the Holmium ions do not absorb their own photonic radiation. That is, if transparency is not reached the Holmium absorbs its own lower level photonic radiation because there are not enough Holmium ions excited to higher energy levels to emit enough photons for fiber laser to lase. The problem is solved by the present invention which uses less than 2% by atomic weight of Holmium as the doping ion in the fiber core 17a, 17b, and compensating for the lower doping percentage by making the fiber laser 11 longer in length.

In the prior art sensitizer ions are typically added along with the Holmium ions in a fiber or crystal laser 10, but this is not done with the present invention. Sensitizer ions are added in the prior art to improve the efficiency of laser 10 by allowing absorption of pump radiation to transfer to the lasing ion (Holmium). Thulium (Tm) has proven to be an effective sensitizer for Holmium. However, the use of sensitizers has severe disadvantages for power scaling. For example, the near energy resonance between Tm $^3F_4$ and Ho $^5F_7$ results in incomplete energy transfer from the sensitizer ions. At room temperature with otherwise optimal densities of sensitizer ions, there is only a small fraction of energy transfer to the Holmium ions this limits efficiency and power scaling. This incomplete transfer proportionally increases the already high lasing thresholds associated with Holmium. Further, the interaction of Tm $^3F_4$ and Ho $^5F_7$ metastable ions create a detrimental up conversion loss process that severely limits energy storage lifetimes and small signal gains.

With no sensitizer ions being added with the Holmium ions energy mismatches and inefficiencies created by sensitizer ions are eliminated. This results in greater energy efficiency of fiber laser 10 in accordance with the teaching of the present invention.

The pump is preferably a laser diode array 12, well known in the art, providing an output at a wavelength of 1.9 μm. However, any other source capable of providing 1.9 micron radiation may be used. The output from laser diode array 12 is directly input to one end of fiber 11 using a focusing lens 13 in manner well known in the art. If laser diode array 12 has an integral focusing lens, lens 13 may not be needed. The pump light from laser diode array 12 is coupled into inner cladding layer 18, and as it propagates along optical fiber 11, the pump light is absorbed by the Holmium ions in central core 17 pumping them from one energy level to another as described herein after.

The direct optical pumping of the Holmium ions by laser diode array 12 is from the Holmium $^5I_8$ level to the $^5I_7$ level. The coherent light output from fiber laser 10 has a wavelength of 2.0 μm which provides a pump ratio of 0.9 (1.9/2.0). This yields a very low quantum defect.

The quantum defect (i.e., the pump wavelength is shorter and more energetic than the output wavelength) typically results in heat generation within fiber 11. The increase in temperature increases the laser threshold and robs efficiency. Stated another way the quantum defect accounts for the energy difference between the pumping and lasing fields, which is given up as heat in the host medium of fiber 11. The high pump ratio of 0.9 for laser 10 yields a low quantum defect with greatly reduced heat generation.

A material that is capable of lasing in a transition between two energy levels shows fluorescence at the wavelength corresponding to that transition between the atomic energy levels or states. Atomic energy levels are the specific energy levels that electrons can occupy for a specific element if given a sufficient amount of energy, and FIG. 2 is an energy level diagram of some of the energy levels for Holmium.

Figure 2:
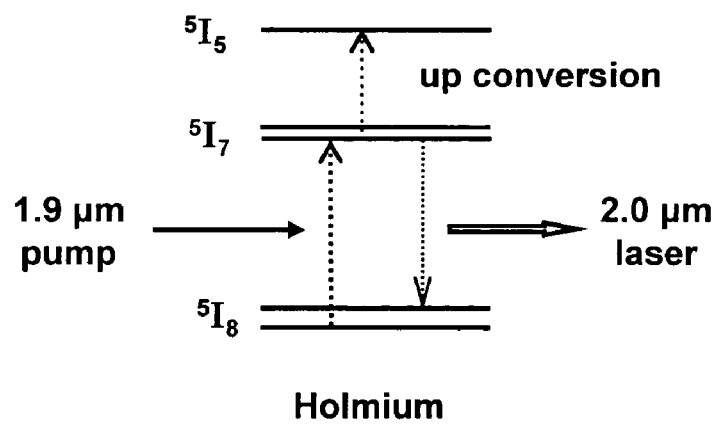
FIG. 2 is an energy level diagram which illustrates the pumping transitions for the Holmium doped fiber laser device of the present invention shown in FIG. 1.

FIG. 2 is an energy level diagram which illustrates the pumping transitions for the Holmium doped fiber laser device of the present invention shown in FIG. 1. Three energy levels $^5I_8$, $^5I_7$ and $^5I_5$, of Holmium are shown. The preferred operation of laser 10 is to use the 1.9 μm wavelength output from laser diode array 12 to pump the energy level of Holmium ions from their $^5I_8$ level to their $^5I_7$ and let them undergo a transition to their lower energy level $^5I_8$. In the process photons are emitted providing the 2.0 μm wavelength output from laser 10.

Another advantage achieved with the present invention is that there is less detrimental heat generated because with the lower percentage of doping Holmium ions, less up conversion takes place which is a prime cause of heating in Holmium lasers. Up conversion occurs when holmium ions at the $^5I_7$ level are pumped further up to their $^5I_5$ level. Up conversion is unwanted in laser 10 and decreases its efficiency. The energy produced by up conversion converts to phonons which are acoustic energy that is converted to unwanted heat energy in laser 10. Stated another way, up conversion is defined as pumping ions from one excited state to a higher excited state. Sometimes certain up conversions may be desired but other up conversions are detrimental as with laser 10.

There is strong evidence that up conversion losses due to direct interaction among Ho $^5I_7$ ions are very small compared to losses due to the interactions of Ho $^5I_7$ ions with ions of sensitizer or co-doping materials such as Thulium. Thus, by reducing the up conversion losses the efficiency of the fiber laser of the present invention is increased.

Figures 3A, 3B:
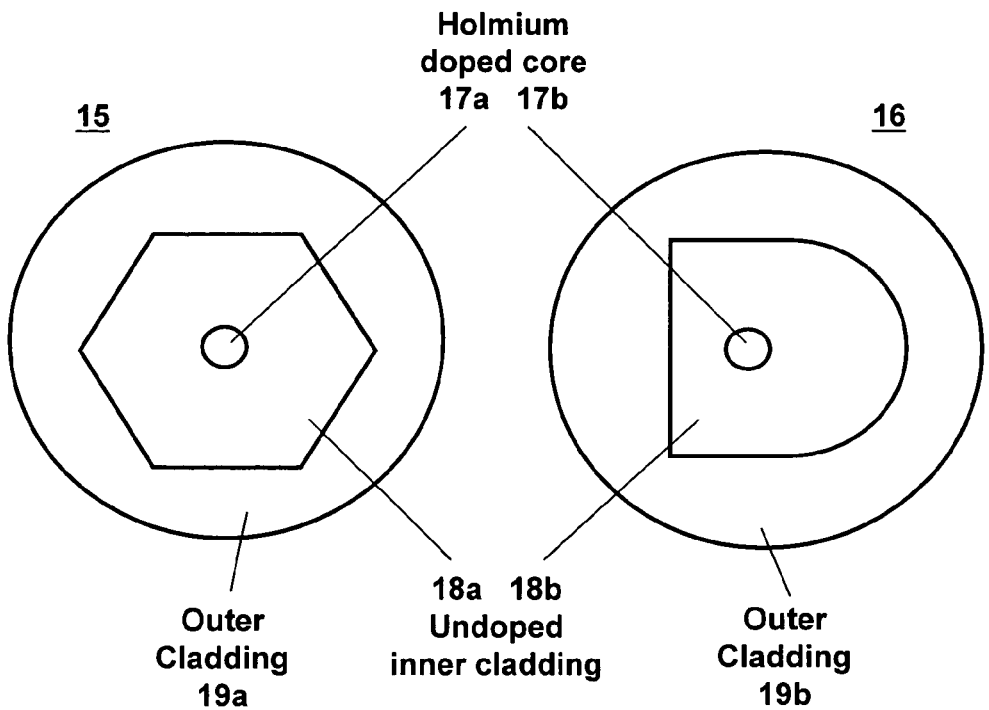
FIGS. 3A and 3B are cross-sections of non-circular double clad, Holmium doped fibers that may used in implementing the present invention.

FIGS. 3A and 3B are cross-sections of non-circular, double clad, Holmium doped fibers that are shown as examples used in implementing the present invention. Conventional fibers having a circular core and circular cladding layers may also be used although not shown in the drawing.

Typically, both the central core 17a, 17b and the inner cladding 18a, 18b will be made of the same material, but each is doped with other materials in order to raise the refractive index of the core 17a, 17b and lower the refractive index of the inner cladding 18a, 18b. More particularly, fiber 11 is constructed from a double clad fiber with a central core 17a or 17b of a first refractive index ($\eta_1$) that is doped with Holmium active ions, an inner cladding 18a or 18b of a second, lower refractive index ($\eta_2$ and $\eta_2<\eta_1$) surrounding the central core and an outer cladding 19a or 10b of a third, even lower, refractive index ($\eta_3$ and $\eta_3<\eta_2<\eta_1$) surrounding the inner cladding layer. In fiber 11 the core 17a or 17b is doped with Holmium ions between 0.1 and 2.0 percent by atomic weight and functions as the laser and as a waveguide while the inner cladding functions as a waveguide for the coherent light from the laser diode array.

The core 17a, 17b of a fiber laser typically has a diameter of about 20 μm and supports propagation of only a single spatial mode of the light. The undoped inner cladding layer 18a, 18b has a rough diameter of about 500 μm. It may have a circular cross-section, as mentioned above, or have some other shape, such as rectangular or elliptical, for polarization preservation. In preferred embodiments of the invention the inner cladding layer 18, 18b has the shapes shown in FIGS. 3A and 3B to eliminate skew rays. Other shapes may also be utilized to achieve the desired purpose of eliminating skew rays. The inner cladding 18a, 18b is typically a multimode waveguide and has a size and shape selected to match that of the pump light received from laser diode array 12 for maximum coupling efficiency. The outer cladding layers 19a, 19b serve to confine the pump laser light to central core 17a, 17b and inner cladding layers 18a, 18b.

Figure 4:
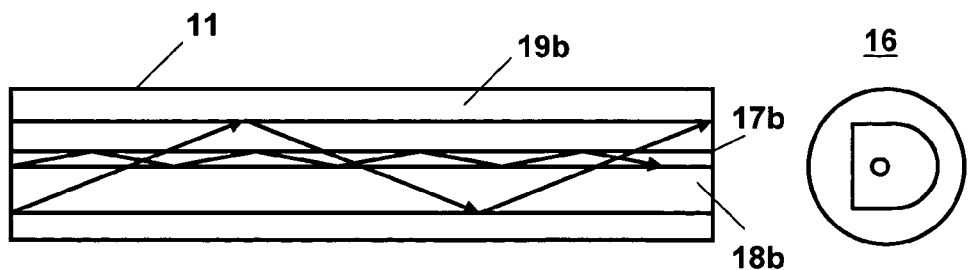
FIG. 4 is a cutaway side view of the double clad, Holmium doped fiber that is shown in FIG. 3B as it contains pump light and coherent light generated in its operation.

FIG. 4 is a cutaway side view of the double clad, Holmium doped fiber that is shown in FIG. 3B as pump light from laser diode array 12 and coherent light generated in its operation are conducted through fiber 11. Pump light from laser diode array 12 is coupled into inner cladding layer 18 and central core 17b at the left end of optical fiber 11. As the 1.9 µm pump light propagates along fiber 11, contained within inner cladding layer 18b it intersects central core 17b, as shown, and the pump light is absorbed by Holmium doping ions therein pumping them from a lower energy level to higher energy level as described above with reference to FIG. 2. As the energized Homium ions transition back to their lower states photons are emitted providing the 2.0 µm wavelength output from laser 10. The 2.0 µm wavelength light generated in core 17b is confined to core 17b, and is guided therein, by total internal reflection at the central core to inner cladding layer boundary caused by the difference in the index of refraction as previously described.

A particular drawback of the total internal reflection mechanism of a fiber 11, such as shown in FIG. 4, is that it acts to confine the light to the higher index portion of fiber 11, which is its core 17b. The higher refractive index core 17b is typically higher in density and so is characterized by higher attenuation due to Rayleigh scattering and by a higher non-linear coefficient. These effects can be mitigated by designing total internal reflection waveguides that have relatively high effective area, such as shown in and described with reference to FIGS. 5 and 6.

Figure 5:
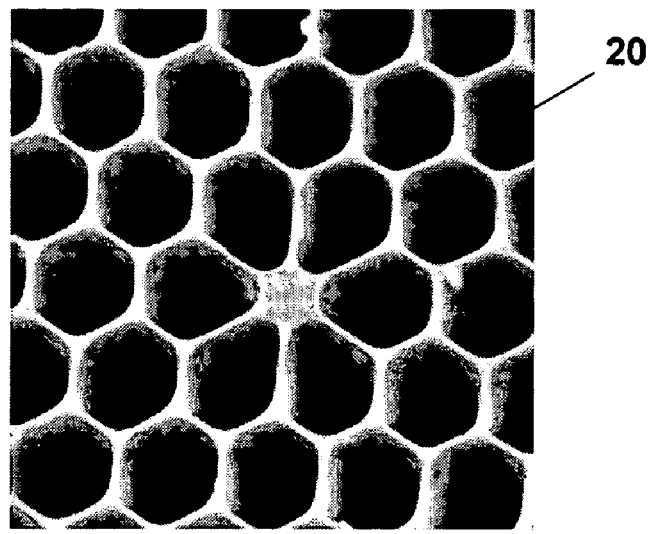
FIG. 5 shows an end view of a photonic crystal fiber providing total internal reflection that may be used in implementing the present invention.

FIG. 5 shows an end view of a photonic crystal fiber that may be used in implementing the present invention. The photonic crystal fiber can support a single-mode over a very broad range of wavelengths, it can have a large mode area and thus carry high optical powers, and it can have a large normal dispersion at the telecommunications wavelength of 1.55 microns. A photonic crystal fiber 21 has a lattice of holes 20, which run along its length. The holes are arranged at the vertices and centers of regular hexagons. The holes have a regular period, broken by the omission of one hole near the center of the fiber as shown in FIG. 5. Photonic crystal fibers are typically not circularly symmetric, as a result of the stack-and-draw method typically used to make them.

A photonic crystal fiber for a laser system includes a guiding structure comprising the regular geometric (e.g. hexagonal) array of axial holes formed through the length of the fiber as shown in FIG. 5. More particularly, the guiding structure includes a central silica rod or rods, the omitted one hole, as shown at the middle of FIG. 5, which is doped with a rare earth element for providing optical gain to the laser. A plurality of cylindrical shape silica rods are disposed circumferentially about the central rod or rods to form a cluster.

Each of the plurality of rods includes an axial passage formed there through, as shown in FIG. 5, along the length of the fiber. The entire cluster of rods is then heated until they start to melt so that they begin to sinter together. The cluster of rods are subjected to a repeated drawing process to reduce the diameter of the cluster to a pre-selected diameter. This process causes the boundaries between individual members to be somewhat lost and to form a hexagonal array as shown in FIG. 5. The refractive index of the center rod or rods is greater than the refractive index of the surrounding plurality of rods. In a manner known in the art, as the optical wavelength becomes shorter, the light is locally concentrated at portions having the high refractive index which is the core. This plus the reflective coating described in the next paragraph confines pump light and coherent light generated by laser 10 within fiber 11.

A reflective coating, not shown in FIG. 5, is deposited on an outer surface of the fully drawn and clustered rods to confine therein the pumped laser light from diode laser array. The pumped light from laser diode array 12 is injected into the fiber 11 from one of its ends in the same as for any fiber 11 used to implement the present invention. The mode field diameter of the fiber 11 is controlled by properly selecting the diameter and spacing of the passages in the plurality of rods.

When the photonic crystal fiber 110 is employed as a laser, dielectric coatings (not shown) are deposited at the ends of the photonic crystal fiber 21. The dielectric coating is highly reflective at the wavelength of the laser and minimally reflective at the pump wavelength. If the optical fiber 11 is long enough, the pump light will essentially be entirely absorbed before it traverses the length of the optical fiber 11. If this is done intentionally, it really does not matter what the reflectivity of the dielectric coating is at the pump wavelength at the end of the optical fiber that is not pumped. Because fiber 11 in laser 10 of the present invention is already longer than normal for reasons previously described, it is desirable to minimize the length of optical fiber 11 by the use of the dielectric reflective coatings at the two ends of the fiber.

Figure 6:
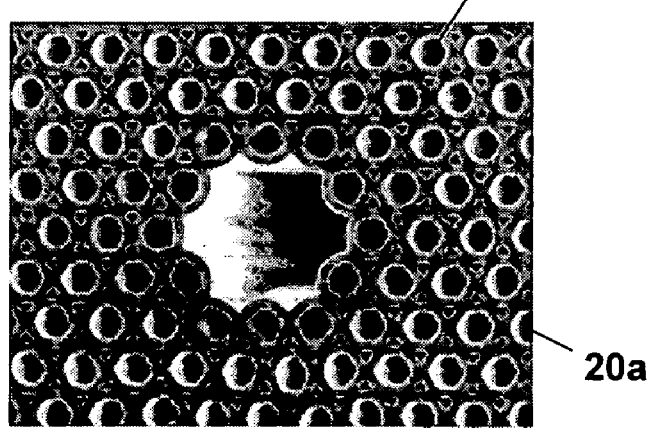
FIG. 6 shows an end view of a photonic bandgap crystal fiber that may be used in implementing the present invention.

FIG. 6 shows an end view of a photonic bandgap crystal fiber that may be used in implementing the present invention. The photonic bandgap crystal fiber is a regular lattice of holes in which the spacing of the features is of the order of the light wavelength to be guided. The photonic bandgap crystal fiber is based on photonic-band-gap effects rather than total internal reflection inside the optical fiber. Photonic-band-gap guidance can be obtained by suitable design of the array of air holes. Light of some propagation constants can be confined to the core and will propagate therein.

The photonic crystal is constructed of a first material having a first refractive index $\eta_a$. Embedded in this first material, in the form of a regular lattice or array, is a second material having a second refractive index $\eta_b$ where $\eta_b < \eta_a$. This is the basic photonic crystal structure. Variations on this basic design can include more than two materials in the make up of the photonic band-gap crystal. The number of useful variations in the details of the lattice structure is large.

In the basic photonic crystal structure, the second material is often simply pores or voids formed in the first material. That is, the voids serve as the second material in a photonic bandgap crystal fiber. Depending upon the refractive index difference of the materials and the spatial arrangement and pitch (center to center distance between features) of the embedded features, the photonic crystal fiber will not propagate light having a wavelength within a certain wavelength band. This is the "band-gap" of the photonic crystal fiber and is the property of the photonic crystal fiber that provides for light confinement. It is due to this property that the structure is given the name, photonic band-gap crystal fiber.

To form an optical waveguide (or more generally, a structure that guides electromagnetic energy), a defect is formed in the photonic band-gap crystal fiber. The defect is a discontinuity in the lattice structure and can be a change in pitch of the lattice, the replacement of a portion of the lattice by a material of different refractive index, or the removal of a portion of the photonic band-gap crystal material. The shape and size of the defect(s) are selected to support one or more modes of light propagation having respective wavelengths within the band-gap of the photonic crystal. The walls of the defect are thus made of a material, a photonic band-gap crystal, which will not propagate the mode produced by the defect.

With a photonic crystal fiber of FIG. 5, or a photonic bandgap crystal fiber of FIG. 6 the light is locally concentrated at portions having the high refractive index. In the case of these two photonic fibers there is more area having the high refractive index to conduct the light. As the optical wavelength of pump light and generated coherent light becomes shorter the light is locally concentrated at portions having the high refractive index.

While what has been described herein is the preferred embodiment of the invention it will be understood by those skilled in the art that numerous changes may be made without departing from the spirit and scope of the invention.

The invention claimed is:

1. A fiber laser device comprising:
a double clad fiber with a core of a first refractive index made of a host material doped with less than 2% holmium active ions, an inner cladding of a second, lower refractive index surrounding the doped core and an outer cladding of a third, even lower, refractive index surrounding the inner cladding, the fiber having a length long enough to produce an output laser emission with that low percentage of holmium doping; and wherein
the fiber laser has a quantum defect less than 1.0 when the holmium ions are directly pumped with a pump beam having a wavelength at or near 1.9 μm to produce an output laser emission having a wavelength at 2.0 μm.

2. The holmium fiber laser device of claim 1 wherein the host material has no sensitizer ions to thereby eliminate any energy mismatches caused by sensitizer ions, and thereby increase the efficiency of the fiber laser device while minimizing detrimental thermal loading in the fiber laser caused by upconversion loss processes.

3. The holmium fiber laser device of claim 1 further comprising a radiation source providing an output at a wavelength at or near 1.9 μm that is used to directly pump the holmium doped fiber at the holmium $^5I_7$ to $^5I_8$ transition.

4. The holmium fiber laser device of claim 1 wherein the doping with less than 2% holmium active ions in the fiber reduces unwanted upconversions losses in the fiber laser device which thereby helps to minimize detrimental thermal loading in the fiber laser.

5. The holmium fiber laser device of claim 1 wherein the doping with less than 2% holmium active ions in the fiber reduces absorption of its own energy to thereby increase the operating efficiency of the laser.

6. The holmium fiber laser device of claim 1 wherein the fiber is a double clad fiber made from a glass such as silica glass or any other compound which can support Holmium doping.

7. The holmium fiber laser device of claim 1 wherein the fiber is a photonic crystal fiber.

8. A holmium fiber laser device comprising:
a double clad fiber with a core of a first refractive index made of a host material doped with less than 2% of holmium active ions, an inner cladding of a second, lower refractive index surrounding the doped core and an outer cladding of a third, even lower, refractive index surrounding the inner cladding, and the fiber having a length long enough to produce an output laser emission with that low percentage of holmium doping; and a pump source providing a coherent output at a wavelength at or near 1.9 μm that is used to directly pump the holmium doped fiber at the holmium $^5I_7$ to $^5I_8$ transition.

9. The holmium fiber laser device of claim 8 wherein the holmium doped fiber pumped at or near 1.9 μm provides an output laser emission at 2.0 μm.

10. The holmium fiber laser device of claim 9 wherein the fiber is a glass such as a silica double clad fiber.

11. The holmium fiber laser device of claim 10 wherein the fiber is a photonic crystal fiber.

12. The holmium fiber laser device of claim 11 wherein the low doping percentage of holmium active ions in the fiber eliminates any absorption of its own energy to thereby increase the operating efficiency of the laser.

13. A fiber laser device comprising:
a double clad fiber with a core of a first refractive index made of a host material doped with less than 2% holmium ions, an inner cladding of a second, lower refractive index surrounding the doped core and an outer cladding of a third, even lower, refractive index surrounding the inner cladding, and the fiber having a length long enough to produce an output laser emission with that low level of doping,
wherein the host material of the fiber has no sensitizer ions added thereto to eliminate any energy mismatches caused by sensitizer ions, and thereby increase the efficiency of the fiber laser device while minimizing detrimental thermal loading in the fiber laser caused by upconversion loss process.

14. The holmium fiber laser device of claim 13 wherein the doping with less than 2% active ions in the fiber eliminates absorption of its own energy to thereby increase the operating efficiency of the laser.

* * * * *